United States Patent
Trottier-Lapointe et al.

(10) Patent No.: US 10,877,182 B2
(45) Date of Patent: Dec. 29, 2020

(54) OPTICAL ARTICLE COMPRISING A SUBSTRATE WITH AN ANTIREFLECTIVE COATING

(71) Applicants: CORPORATION DE L'ECOLE POLYTECHNIQUE DE MONTREAL, Montreal (CA); ESSILOR INTERNATIONAL, Charenton-le-Pont (FR)

(72) Inventors: William Trottier-Lapointe, Montreal (CA); Oleg Zabeida, Montreal (CA); Ludvik Martinu, Montreal (CA); Jolanta Klemberg-Sapieha, Montreal (CA); Karin Scherer, Charenton-le-Pont (FR)

(73) Assignees: ESSILOR INTERNATIONAL, Charenton-le-Pont (FR); CORPORATION DE L'ECOLE POLYTECHNIQUE DE MONTREAL, Montreal (CA)

( * ) Notice: Subject to any disclaimer, the term of this patent is extended or adjusted under 35 U.S.C. 154(b) by 147 days.

(21) Appl. No.: 16/300,379

(22) PCT Filed: May 11, 2017

(86) PCT No.: PCT/EP2017/061289
§ 371 (c)(1),
(2) Date: Nov. 9, 2018

(87) PCT Pub. No.: WO2017/194657
PCT Pub. Date: Nov. 16, 2017

(65) Prior Publication Data
US 2019/0121000 A1    Apr. 25, 2019

(30) Foreign Application Priority Data
May 11, 2016  (EP) .................................... 16305552

(51) Int. Cl.
G02B 27/00    (2006.01)
G02B 1/111    (2015.01)
G02B 1/14    (2015.01)

(52) U.S. Cl.
CPC ................. G02B 1/111 (2013.01); G02B 1/14 (2015.01)

(58) Field of Classification Search
CPC . G02B 1/00; G02B 1/04; G02B 1/041; G02B 1/043; G02B 1/10; G02B 1/11;
(Continued)

(56) References Cited

U.S. PATENT DOCUMENTS 5,508,368 A    4/1996  Knapp et al.
6,805,903 B2 *    10/2004  Yoshida ................ C03C 17/007
                                                                        427/166
(Continued)

OTHER PUBLICATIONS

Hsu et al., "Anti-reflective effect of transparent polymer by plasma treatment with end-hall ion source and optical coating," *Opt. Rev.*, 2010, 17:1-4.
(Continued)

*Primary Examiner* — Arnel C Lavarias
(74) *Attorney, Agent, or Firm* — Norton Rose Fulbright US LLP (57) ABSTRACT

An optical article including a substrate with two main surfaces, at least one of which is covered by a polymer coating having an outer surface, said coating including a first superficial layer beneath the outer surface having a first refractive index $n_1$ and a second layer beneath the first superficial layer having a second refractive index $n_2$, with $n_2 < n_1$ and having the lowest refractive index of said polymer coating, and said coating exhibiting antireflective properties due to the difference between refractive indexes $n_1$ and $n_2$, said refractive index difference within the coating resulting from a plasma, corona, and/or an ion beam treatment of an
(Continued)

initial polymer coating, through the outer surface. Also, a method for manufacturing this optical article.

20 Claims, 4 Drawing Sheets (58) Field of Classification Search
CPC ......... G02B 1/111; G02B 1/113; G02B 1/115; G02B 1/118; G02B 1/12; G02B 1/14; G02B 1/18; G02B 5/28; G02B 5/281; G02B 5/285; G02B 5/286; G02B 5/287
USPC ....... 359/350, 355, 356, 359, 577, 580, 581, 359/582, 586, 588, 589, 590
See application file for complete search history.

(56) References Cited

U.S. PATENT DOCUMENTS

| | | | | |
|---|---|---|---|---|
| 9,703,011 | B2* | 7/2017 | Adib | .................. C03C 3/095 |
| 2013/0215513 | A1* | 8/2013 | Liang | .................. C23C 18/122 |
| | | | | 359/601 |
| 2013/0271842 | A1 | 10/2013 | Miyahara et al. | |
| 2014/0009834 | A1* | 1/2014 | Kalyankar | ............. G02B 1/115 |
| | | | | 359/586 |
| 2015/0309214 | A1 | 10/2015 | Schulz et al. | |
| 2016/0376450 | A1 | 12/2016 | Jung et al. | |

OTHER PUBLICATIONS

International Search Report and Written Opinion issued in International Patent Application No. PCT/EP2017/061289, dated Aug. 18, 2017.
Oehrlein et al., "Plasma-polymer interactions: a review of progress in understanding polymer resist mask durability during plasma etching for nanoscale fabrication," *J. Vac. Sci. Technol. B Microelectron. Nanom. Struct.*, 2011, 29:010801.
Schulz and Kaiser, "Antireflective Coating with Nanostructured Organic Top-Layer," *Opt. Interf. Coatings 1*, 2010, WA2.
Schulz et al., "Antireflection of transparent polymers of advanced plasma etching procedures," *Opt. Express 15*, 2007, 13108-13113.
Steiner & Fahlteich, "Vacuum plasma treatment and coating of fluoropolymer webs—challenges and applications," Fraunhofer Institute for Organic Electronics, Electron Beam and Plasma Technology, 2016, 8 pages.

* cited by examiner

Initial　　　　　　　　Treated

OPTICAL ARTICLE COMPRISING A SUBSTRATE WITH AN ANTIREFLECTIVE COATING

CROSS-REFERENCE TO RELATED APPLICATIONS

This application is a national phase application under 35 U.S.C. § 371 of International Application No. PCT/EP2017/061289 filed 11 May 2017, which claims priority to European Patent Application No. 16305552.8 filed 11 May 2016. The entire contents of each of the above-referenced disclosures is specifically incorporated by reference herein without disclaimer.

The present invention concerns an optical article, in particular an ophthalmic lens, comprising an antireflective polymer coating and a method for manufacturing such an optical article.

A typical optical article construction, such as an ophthalmic lens construction, comprises a substrate, preferably made of an organic glass, at least a main surface of which is usually coated with polymeric coatings to improve the impact and/or abrasion and/or scratch resistance of the organic glass.

In order to impart antireflecting properties to the optical article, whether or not coated with the above polymer coatings, it is usual to form on the substrate or the polymer coatings an antireflective coating. Typically, such an antireflective coating is made of a stack of inorganic layers having alternatively low and high refractive indexes.

Besides the fact that the deposition of such an antireflective coating implies an additional manufacturing step, the presence of this antireflective coating of inorganic nature is detrimental to the mechanical properties of the article.

It has also been proposed to impart antireflecting properties to an optical article by controlling the roughness of the surface of a polymeric coating formed on a main surface of the substrate of the article. This roughness control can be obtained by submitting the outer surface of the coating to a plasma etching. See for example:
1. J. Hsu, P. Wang, Y. Lin, and H. Chen, "Anti-reflective effect of transparent polymer by plasma treatment with end-hall ion source and optical coating," Opt. Rev. 17, 1-4 (2010)
2. U. Schulz and N. Kaiser, "Antireflective Coating with Nanostructured Organic Top-Layer," Opt. Interf. Coatings 1, WA2 (2010)
3. U. Schulz, P. Munzert, R. Leitel, I. Wendling, N. Kaiser, and a Tünnermann, "Antireflection of transparent polymers by advanced plasma etching procedures.," Opt. Express 15, 13108-13 (2007)
4. G. S. Oehrlein, R. J. Phaneuf, and D. B. Graves, "Plasma-polymer interactions: A review of progress in understanding polymer resist mask durability during plasma etching for nanoscale fabrication," J. Vac.

However, the superficial nanostructures, thus created, are mechanically weak and are easily altered by external mechanical action, such as rubbing, wiping, etc., therefore resulting in a decrease and even a loss of the antireflective properties.

Thus, the aim of the present invention is to provide an optical article having anti reflecting properties without the drawbacks of the known prior art.

More specifically, the aim of the present invention is to provide an optical article having antireflective properties which does not comprise an antireflective coating made of a stack of inorganic material layers and does not exhibit the mechanical weaknesses of a coating with a roughened surface.

Figure 7:
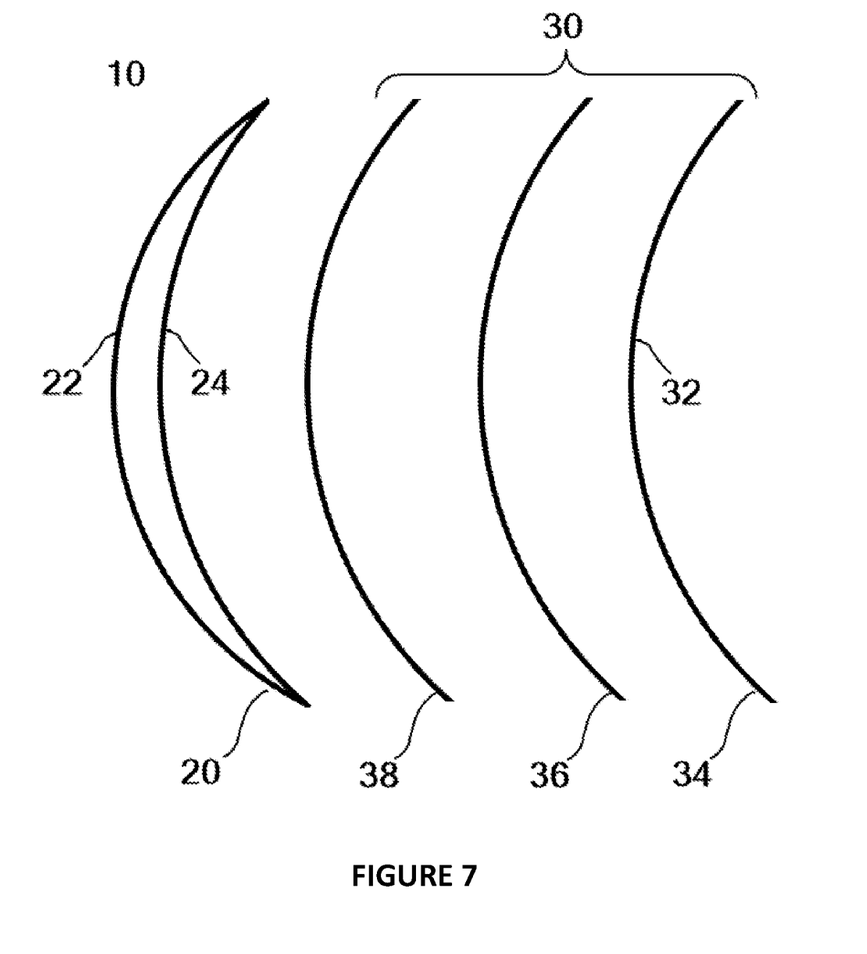
FIG. 7: Illustration of an embodiment of an optical article according to the invention that includes a substrate with two main surfaces, and a polymer coating comprising a first superficial layer, a second layer, and a third layer.

The above goals are achieved by the invention which provides an optical article 10 comprising a substrate 20 with two main surfaces 22 and 24, at least one of which is covered by a polymer coating 30 having an outer surface 32, said coating comprising a first superficial layer 34 beneath the outer surface 32 having a first refractive index n1 and a second layer 36 beneath the first superficial layer 34 having a second refractive index n2, with n2<n1, and having the lowest refractive index of said polymer coating, and said coating exhibiting antireflective properties due to the difference between refractive indexes n1 and n2, said refractive index difference within the coating resulting from a plasma, a corona and/or an ion beam treatment of an initial polymer coating, through the outer surface 32.

Without being linked by a particular theory, it seems that the plasma, corona and/or ion beam treatment is partially eliminating the organic material of the coating in a subsurface of this coating, creating a porosity that involves a decrease of the refractive index in a certain depth of the coating. A layer having a lower porosity is then created. As an alternative, a profile of porosity and/or refractive index from the outer surface of the coating is created within the depth of the coating until reaching a minimum and thereafter the refractive index increases again while progressing in the depth of the coating up to achieving the refractive index of the polymer coating before any treatment.

At the same time, the surface roughness of the coating is not or slightly affected by the treatment and a densification of the polymeric material can happen in a thin layer. In certain cases, it might increase superficially the refractive index of the coating.

Corresponding structures of the coating will be detailed hereafter.

In the present specification, the expression "outer surface" [of a coating] means the surface of the coating that is the farthest from the substrate.

When a layer A is positioned beneath a layer B, it means that the layer B is farther from the outer surface.

Although otherwise stated the refractive indexes are measured at 25° C. at a wavelength of 550 nm.

A layer of the organic coating is defined as a layer wherein the refractive index is homogeneous and can be measured.

It is considered that a layer having 1-5 nm thickness is homogeneous.

In an embodiment, the first superficial layer and the second layer are adjacent.

In another embodiment, the first layer and the second layer are not adjacent and the refractive index within the polymer coating can vary in a continuous or a discontinuous manner from the first superficial layer to the second layer, in particular the variation of the refractive index within the polymer coating can be a gradient.

The thickness of the first superficial layer, second and third layer might typically range from 1 to 55 nm. In one embodiment they are preferably thin (typically from 1 to 5 nm).

Preferably, the difference n1−n2 of the refractive indexes is higher than or equal to 0.05, more preferably higher than or equal to 0.10, better higher than or equal to the following values: 0.15, 0.20, 0.25, 0.30 and the refractive index $n_2$ of the second layer exhibits the lowest refractive index of the polymer coating after plasma, corona and/or ion beam treatment.

In general, the refractive index n1 in the first superficial layer ranges from 1.45 to 1.65 and the refractive index n2 in the second layer ranges from 1.25 to less than 1.45.

Typically, the second layer has a higher porosity than the first layer. The porosity measurement is the ellipsometry method utilising the Lorentz-Lorentz equation expressed in the case of a blend of 2 materials wherein the second material is air. It is necessary to introduce in the formula the refractive index of the dense material (e.g. the coating material). The maximum porosity of the second layer ranges from 10 to 70%, preferably from 20 to 60% and more preferably from 20 to 40%. A typical value for the porosity of the second layer is 30%.

Also, preferably, the outer surface of the polymer coating exhibits a greater hardness after the plasma and/or ion beam treatment than initially.

The polymer coating has in general a thickness ranging from 1 to 10 microns, preferably from 2 µm to 4 µm.

Usually, the second layer is located 15 nm to 55 nm beneath the outer surface of the polymer coating.

In an embodiment, the coating comprises a third layer 38 located beneath said second layer and having a refractive index n3>n2.

In another embodiment, the refractive index within the polymer coating can vary in a continuous or a discontinuous manner from the second layer to the third layer, in particular the variation of the refractive index within the polymer coating can be a gradient.

In another embodiment, the refractive index of the third layer is the same as the initial refractive index of the polymer coating before plasma, corona or ion beam treatment.

In another embodiment $n_3 < n_1$.

In general, the outer surface of the polymer coating has a low roughness. Typically, said outer surface of the coating has a roughness Ra lower than 10 nm, preferably lower than 5 nm, more preferably lower than 2 nm, Ra being determined by Atomic Force Microscopy (AFM).

Ra is defined classically as the arithmetic average of absolute values of the vertical deviations of the roughness profile from the mean line.

In an embodiment, the polymer coating comprises a matrix comprising organic groups. Organic groups (groups containing carbon atoms).

In another embodiment, the polymer coating comprises —(Si—O)— units and is preferably a polysiloxane.

Preferably, the polymer coating comprises at least one epoxysilane polymer and optionally at least one colloid.

Preferably, the polymer coating comprises an abrasion resistant and/or anti-scratch coating.

Preferred epoxysilane polymers are epoxyalkoxysilane polymers and in particular epoxytrialkoxysilane polymers such as α-glycidoxypropyltrimethoxysilane and α-glycidoxypropyltriethoxysilane polymers.

Preferably, said epoxysilane has the following formula:

$$R_nY_mSi(X)_{4-n-m} \quad (I)$$

Wherein R groups, identical or different, are monovalent organic groups linked to the Si atom by a carbon atom and comprising at least one, preferably one epoxy function; X groups, identical or different, are hydrolyzable groups; Y is a monovalent organic group that does not contain an epoxy group and which is linked to the Si atom by a carbon atom, n and m being integers such as n=1 and m=0 or 1.

The preferred R groups have the following formulas V and VI:

wherein $R^2$ is an alkyl group, preferably a methyl group or a hydrogen atom, more preferably a hydrogen atom; a and c are integers ranging from 1 to 6 and b is representing 0, 1 or 2.

Most preferred epoxysilanes are those wherein, in formula I, n=1, m=0 and X is a C1-05 alkoxy group, preferably OCH$_3$.

Many epoxy-functional alkoxysilanes are suitable as hydrolysis precursors, including epoxydialkoxysilanes such as γ-glycidoxypropylmethyldimethoxysilane, γ-glycidoxypropylmethyldiethoxysilane, γ-glycidoxypropyl-methyl-di-isopropenoxysilane, and γ-glycidoxyethoxypropylmethyldimethoxysilane;

Epoxytrialkoxysilane such as glycidoxymethyl-trimethoxysilane, glycidoxymethyltriethoxysilane, glycidoxymethyl-tripropoxysilane, glycidoxymethyl-tributoxysilane, beta-glycidoxyethyltrimethoxysilane, beta-glycidoxyethyltriethoxysilane, beta-glycidoxyethyl-tripropoxysilane, beta-glycidoxyethyl-tributoxysilane, beta-glycidoxyethyltrimethoxysilane, alpha-glycidoxyethyl-triethoxysilane, alpha-glycidoxyethyl-tripropoxysilane, alpha-glycidoxyethyltributoxysilane, gamma-glycidoxypropyl-trimethoxysilane, gamma-glycidoxypropyl-triethoxysilane, gamma-glycidoxypropyl-tripropoxysilane, gamma-glycidoxypropyltributoxysilane, beta-glycidoxypropyl-trimethoxysilane, beta-glycidoxypropyl-triethoxysilane, glycidoxypropyltributoxysilane, eta-glycidoxypropyl-tripropoxysilane, beta-glycidoxypropyltributoxysilane, alpha-glycidoxypropyl-trimethoxysilane, alpha-glycidoxy-propyl-triethoxysilane, alpha-glycidoxypropyl-tripropoxysilane, alpha-glycidoxypropyltributoxysilane, gamma-glycidoxybutyl-trimethoxysilane, delta-glycidoxybutyl-triethoxysilane, delta-glycidoxybutyl-tripropoxysilane, delta-glycidoxybutyl-tributoxysilane, delta-glycidoxybutyl-trimethoxysilane, gamma-glycidoxybutyl-triethoxysilane, gamma-glycidoxybutyl-tripropoxysilane, gamma-propoxybutyl-tributoxysilane, delta-glycidoxybutyl-trimethoxysilane, delta-glycidoxybutyl-triethoxysilane, delta-glycidoxybutyl-tripropoxysilane, alpha-glycidoxybutyl-trimethoxysilane, alpha-glycidoxybutyl-triethoxysilane, alpha-glycidoxybutyl-tripropoxysilane, alpha-glycidoxybutyl-tributoxysilane, (3,4-epoxycyclohexyl)-methyl-trimethoxysilane, (3,4-epoxycyclohexyl)methyl-triethoxysilane, (3,4-epoxycyclohexyl)methyl-tripropoxysilane, (3,4-epoxycyclohexyl)-methyl-tributoxysilane, (3,4-epoxycyclohexyl)ethyl-triethoxysilane, (3,4-epoxycyclohexyl)ethyl-triethoxysilane, (3,4-epoxycyclohexyl)ethyl-tripropoxysilane, (3,4-epoxycyclohexyl)-ethyl-tributoxysilane, (3,4-epoxycyclohexyl)propyl-trimethoxysilane, (3,4-epoxycyclohexyl)propyl-triethoxysilane, (3,4-epoxycyclohexyl)propyl-tripropoxysilane, (3,4- epoxycyclohexyl)propyl-tributoxysilane, (3,4-epoxycyclohexyl)butyl-trimethoxysilane, (3,4-epoxycyclohexy)butyl-triethoxysilane, (3,4-epoxycyclohexyl)-butyl-tripropoxysilane, and (3,4-epoxycyclohexyl)butyl-tributoxysilane.

Preferably, epoxysilanes are chosen within the group consisting of γ-glycidoxypropyl triethoxysilane, γ-glycidoxypropyl trimethoxysilane, 2-(3,4-epoxycyclohexyl)ethyl trimethoxysilane and 2-(3,4-epoxycyclohexyl) ethyltriethoxysilane or a mixture of two or more thereof.

One preferably uses γ-glycidoxypropyltrimethoxysilane (GLYMO).

According to one aspect of this invention, the epoxysilane is hydrolyzed, preferably before being mixed to the other components of the composition.

The hydrolysis may be performed as known in the art, by using acidic catalysts (hydrochloric acid, acetic acid), in presence of water.

Hydrolysis of the alkoxy groups liberates the associated alcohol to form silanol groups which will condense spontaneously. Preferably, the alkoxysilane is reacted with a stoichiometric amount of water to hydrolyze the hydrolysable groups, typically the alkoxy groups.

In an embodiment, the coating comprises colloids. The colloids that can be used are preferably chosen between silica and high index oxides such as $TiO_2$, $ZrO_2$, $Sb_2O_5$, $WO_3$.

In an embodiment, coating compositions of the polymeric coating contain at least 30%, preferably 30% to 60% by weight of solid material (inorganic colloid) and more preferably 40 to 55% by weight in the dry content of the coating.

Preferred colloid is colloidal silica.

Preferred abrasion resistant coatings are those comprising an epoxysilane polymer and a colloid and in particular those disclosed in EP-0.614.957.

The substrate may be any classical substrate used in the optical field such as a mineral or an organic glass, for example an organic glass made of a thermoplastic or thermocurable plastic.

To be mentioned as especially preferred classes of substrate materials are polycarbonates, polyamides, polyimides, polysulfones, copolymers of polyethylene therephthalate and polycarbonate, polyolefins such as polynorbornenes, resins resulting from polymerization or (co)polymerization of alkylene glycol bis allyl carbonates such as polymers and copolymers of diethylene glycol bis(allylcarbonate) (marketed, for instance, under the trade name CR-39® by the PPG Industries company, the corresponding marketed lenses being referred to as ORMA® lenses from ESSILOR), polycarbonates such as those derived from bisphenol A, (meth)acrylic or thio(meth)acrylic polymers and copolymers such as polymethyl methacrylate (PMMA), urethane and thiourethane polymers and copolymers, epoxy polymers and copolymers, episulfide polymers and copolymers.

In an embodiment, a low surface energy hydrophobic material such as fluorinated resins or fluorinated polymers can be applied as a top coat on the surface of the article having a coating according to the invention.

Preferably the surface energy of such a top coat is lower than or equal to 14 $mJ/m^2$, preferably lower than or equal to 12 $mJ/m^2$. In general, such a low surface energy coating comprises at least one of a fluoropolymer or a fluorosilane. Such fluoropolymers or fluorosilanes include, but are not limited to, Teflon® and commercially available fluorosilanes such as Dow Corning 2604, 2624 and 2634; Daikin Optool DSX®, Shinetsu OPTRON®, heptadecafluorosilane (manufactured, for example, by GELEST), FLUOROSYL® (manufactured, for example, by CYTONIX); FAS13, CYTOP™ (from ASAHI) etc. Such coatings can be applied to the nanostructured surface of the article by dipping, vapor coating, spraying, application with a roller, and other suitable method known in the art.

Compositions containing fluorosilanes recommended for the preparation of hydrophobic and/or oleophobic top-coats are described in U.S. Pat. No. 6,183,872. They contain fluoropolymers with organic groups carrying silicon-based groups represented by the following general formula and with a molecular weight of $5.10^2$ to $1.10^5$:

in which $R_F$ represents a perfluoroalkyl group; Z represents a fluoro or trifluoromethyl group; a, b, c, d and e each representing, independently from each other, 0 or an integer greater than or equal to 1, provided that the sum a+b+c+d+e is not less than 1 and that the order of the repeated units between the brackets indexed under a, b, c, d and e are not limited to the one given; Y represents H or an alkyl group comprising from 1 to 4 carbon atoms; X represents an atom of hydrogen, bromine or iodine;

$R^1$ represents an hydroxyl group or a hydrolysable group; $R^2$ represents an atom of hydrogen or a monovalent hydrocarbon group; m represents 0, 1 or 2; n represents 1, 2 or 3; and p represents an integer equal to at least 1, preferably equal to at least 2.

Particularly preferred are perfluoropolyethers of formula:

wherein Y, $R^1$, m and p are as defined above and a is an integer from 1 to 50.

A formulation containing a fluorosilane given by the previous formula (1) is marketed by DAIKIN INDUSTRIES with the name OPTOOL DSX®.

The document JP 2005 187936 describes fluorinated compounds of silane suitable for forming anti-smudge coatings and particularly compounds given by the formula:

wherein

R'$_F$ is a linear chain divalent perfluoropolyether radical,

R' is an alkyl radical in C$_1$-C$_4$ or a phenyl radical,

X' is a hydrolysable group, a' is an integer from 0 to 2, b' is an integer from 1 to 5, and m' and n' are integers equal to 2 or 3.

A fluorosilane compound given by the formula (2) above is marketed by SHIN-ETSU CHEMICAL CO, Ltd with the name KY-130®.

Fluorosilane compounds given by the formula (2) and methods for preparing them are also described in the patent application EP 1 300 433.

According to the invention, the coating of the present invention has antireflective properties, i.e. the outer surface of said polymer coating exhibits a Rv value lower than 2.5%, preferably lower than one of the following values: 2.4%, 2.3%, 2.2%, 2.1%, 2%, 1.9%, 1.8%, 1.7%, 1.6%, 1.5% at 15° incidence and better lower than 2.5% at 15° and 45° incidence. Luminous reflection Rv, is such as defined in the ISO 13666:1998 Standard, and measured in accordance with the ISO 8980-4 Standard (for an angle of incidence lower than 17°, typically of 15°).

The present invention also concerns a method of manufacturing an optical article as disclosed above which comprises treating with a plasma and/or an ion beam a polymer coating, through its outer surface, of an optical article comprising a substrate with two main surfaces at least one of which is covered by a polymer coating having an outer surface, to create a first superficial layer beneath the outer surface having a first refractive index n1 and a second layer beneath the first superficial blayer having a second refractive index n2, with n2<n1, thereby imparting antireflective properties to the coating.

Preferably, the plasma treatment comprises submitting the outer surface of the polymer coating to an oxygen plasma, preferably under a pressure ranging from 10 milliTorrs to 150 milliTorrs, during a period ranging from 5 minutes to 80 minutes, preferably 15 to 40 minutes, better 15 to 25 minutes.

Also, preferably, the dioxygen plasma is generated using a radiofrequency source with a tension ranging from 100 to 600 V, preferably 100 to 300 V and an applied power ranging from 10 W to 250 W, preferably 20 to 100 W. The applied surface power density is preferably ranging from 0.05 to 1.5 W/cm$^2$, more preferably from 0.1 to 0.55 W/cm$^2$.

In an embodiment, the optical article is treated by a plasma, preferably a dioxygen plasma, obtained by a radiofrequency source with a power ranging from 10 to 50 watts.

The following parts of the description are made in reference with the enclosed Figures which represent.

EXAMPLES

1. Initial Optical Articles

The initial optical articles used in the following examples are ORMA® ophthalmic lenses of organic glass constituted by a diethylene glycol di(allylcarbonate) polymer with a central thickness of 2 mm which were dip coated in a polymer coating composition according to example 3 of EP-0.614.957 and then precured for 15 minutes at 60° C. They were then placed in an oven at 100° C. for 3 hours.

The thickness of the resulting coating was 3 μm.

These initial optical articles are identified A in the following examples.

2. Plasma Treatment

The plasma treatment of the initial optical article A has been effected in a vacuum chamber equipped with a metallic electrode of 15 cm diameter. The samples (4 at the same time) were mounted on the electrode which was fed with a RF power (13.56 MHz).

The plasma was a dioxygen plasma under a pressure of 100 mTorr, a RF power of 26 W and a tension of 120 V or 270 V. Treatment was effected on either one side (coating side) or both sides for different durations.

The following samples were obtained:

| Sample | Tension (V) | Duration (minutes) | Sides treated |
|--------|-------------|--------------------|---------------|
| A1     | 120         | 20                 | Both          |
| A2     | 120         | 40                 | One side      |
| A3     | 120         | 40                 | One side      |
| A4     | 120         | 20                 | One side      |
| A5     | 120         | 20                 | One side      |
| A6     | 270         | 20                 | One side      |
| A7     | 270         | 20                 | One side      |
| A8     | 270         | 20                 | One side      |

3. Transmission Test

Figure 1:
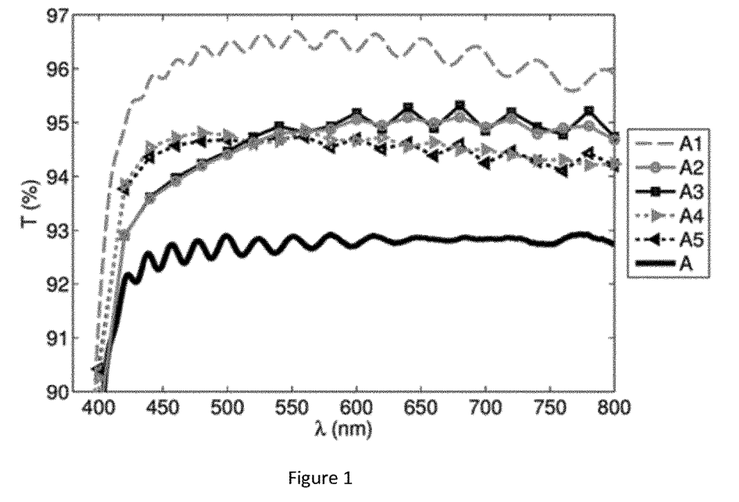
FIG. 1: Graphs of the light transmission of optical articles according to the invention in comparison with a similar optical article not treated according to the invention.

The light transmission of samples A1 to A5 has been determined using standard method by measurement with a spectrometer. Results are shown in FIG. 1 which clearly shows that the optical articles according to the invention have superior light transmission than the initial optical article.

4. Reflection Test

The reflection of samples A6 to A8 has been determined according to standard ISO 8980-4 2006.

Figure 2:
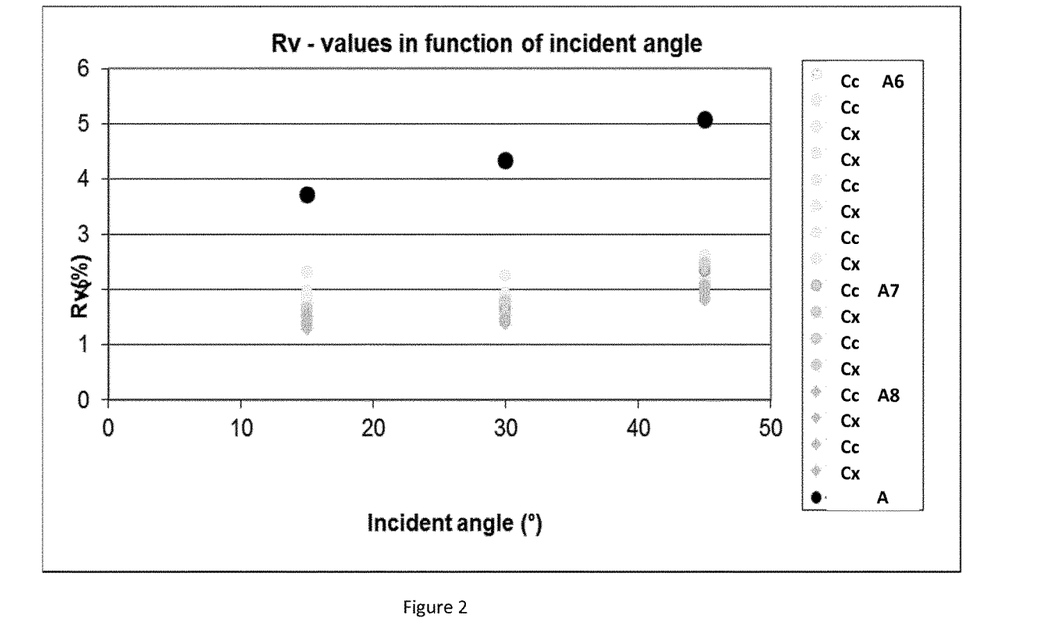
FIG. 2: Graphs of the reflectivity Rv (%) in function of the incident angle for optical articles according to the invention and a similar optical article not treated according to the invention.

Results are given on FIG. 2 which shows that optical articles according to the invention have a reflectivity Rv of at most 2.5% up to an incident angle of 45° whereas the initial optical article A has a reflectivity of more than 3% up to 5% for the incident angle of 45°. It is to be noted that reflection tests have been made on several exemplaries of samples A6 to A8 and that they were made on either the concave face (Cc) or the convex face (Cx).

5. Resistance to Wiping

Sample A6 is subjected to a wiping test using a tribometer Pin-On-Disk Tribometer (TRB) from the CSM company.

For this test, the reflection spectrum of the sample A6 is first measured, and then sample A6 is subjected to wiping using a silicone pin (8 shore 0) which bears on a Cemoi® cloth placed on the sample.

The sample is then moved under the cloth.

Ten circular turns (radius 15 mm) are effected at a speed of 1 cm/s, with increasing strengths (1N, 2N, 5N and 10N). Thereafter, the reflection spectrum is again measured.

Contact areas are depending on the bearing strength and are 0.3 cm² for 1N, 0.5 cm² for 2N, 0.65 cm² for 5N and 1.1 cm² for 10N.

Figure 3:
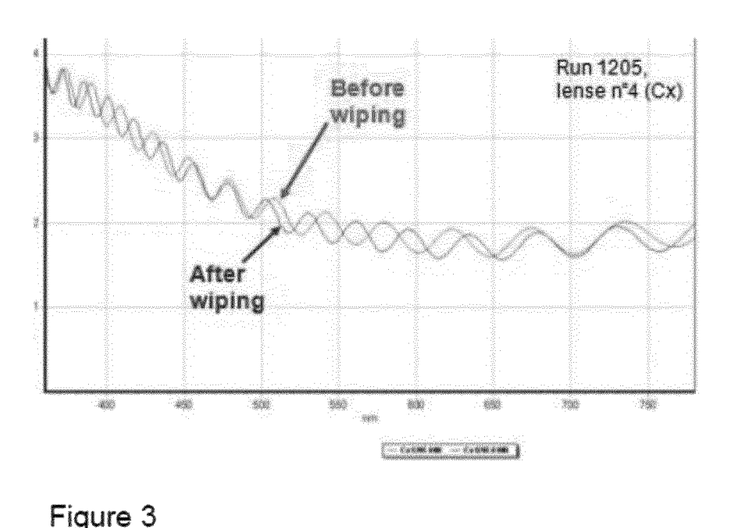
FIG. 3: Graphs of the wiping resistance of an optical article according to the invention.

FIG. 3 shows that the reflection spectrum of the sample does not change after the test which means that the antireflective properties of the polymer coating are not altered.

6. Determination of the Refractive Indexes

The refractive indexes have been determined by spectro-ellipsometry on samples similar to samples A1-A6 but with further measurements for intermediate times of treatment.

Figure 4:
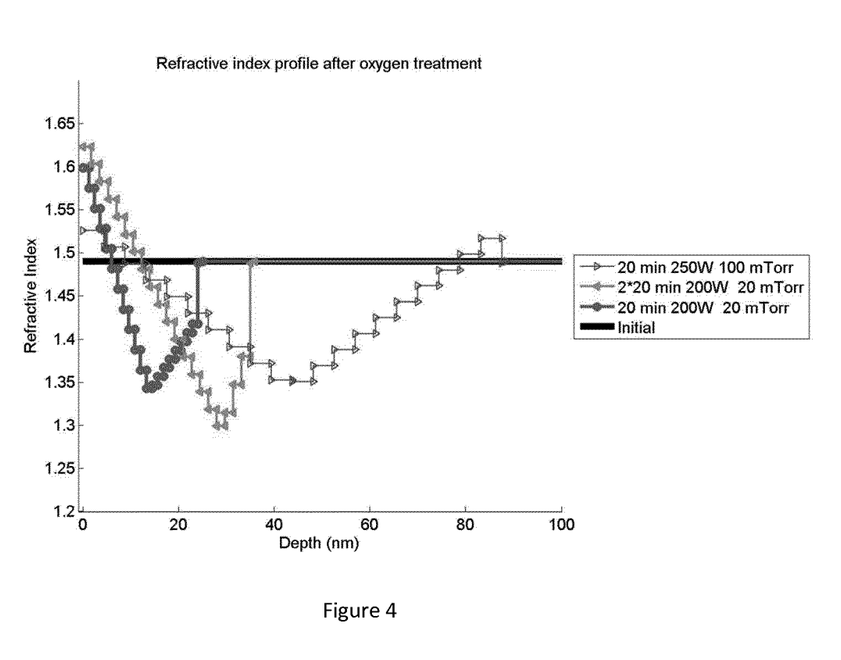
FIG. 4: Graphs of the refractive indexes of different optical article of the invention in function of the depth from the outer surface of the polymer coating.

Results are shown on FIG. 4.

It can be seen on FIG. 4 that the refractive index of the polymer coating before treatment is the same throughout the coating (about 1.49) whereas after a treatment according to the invention 1) the polymer coating comprises a superficial layer having a refractive index which is measured as being higher than the refractive index of the coating before treatment, 2) the refractive index of the polymer coating continuously decreases within the polymer coating.up to reaching a layer whose refractive index is corresponding to a minimum value ($2^{nd}$ layer) and the refractive index further increases up to a third layer having the refractive index of the initial value of the polymer coating value (before plasma treatment). (None of the thin 3 layers (1-5 nm thickness) are represented).

7. Surface Roughness

Figure 5:
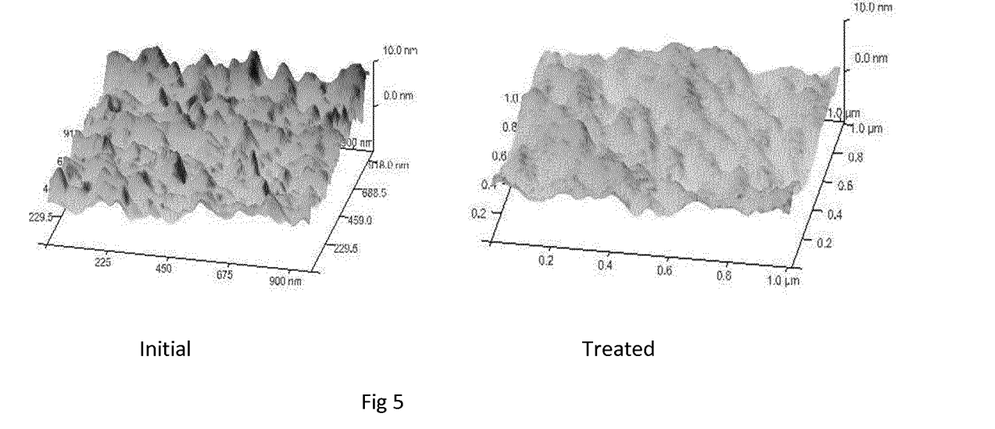
FIG. 5: Atomic Force Microscopy (AFM) pictures of both the outer surface of the polymer coating of an article according to the invention and of the same optical article before plasma treatment.

FIG. 5 shows images obtained by atomic force microscopy of the outer surface of a lens sample A obtained as described in 1. above (control) and a sample according to the invention: same lens sample obtained as described in 1) above is treated by a dioxygen plasma at 250 W, 20 minutes. The obtained sample has 2.5% increase in transmission and clearly, the roughness of the outer surface of the sample according to the invention is less than that of the control sample. This means that the antireflective property of the optical articles of the invention is not a result of an increase of the roughness of the coating outer surface.

8. Surface Hardness

The surface hardness was measured by nanoindentation on a sample A (control) and, a sample according to the invention (sample treated by a dioxygen plasma at 26, W, 270 V).

Hardness H has been determined by nanoindentation as described in WO2015166144.

Also, to assure that result is not due to annealing, a sample A has been annealed at a temperature of 120° C. during 1 hour in atmospheric conditions.

Figure 6:
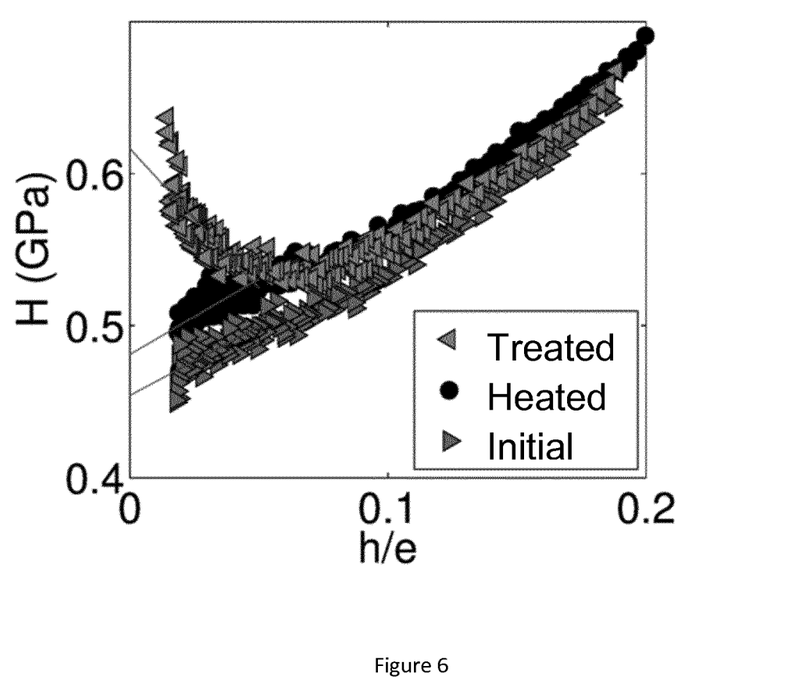
FIG. 6: is a graph of the nanoindentation hardness of the outer surface of an optical article according to the invention and of a same optical article before treatment (control).

Results are shown in FIG. 6 which are graphs of the hardness H(GPA) in function of the ratio h/e (e=thickness of the coating, h=depth under the surface of the coating) in the polymer coating.

It can be seen that there is a coating hardening close to the outer surface for the sample according to the invention.

The invention claimed is:

1. An optical article comprising a substrate with two main surfaces, at least one of which is covered by a polymer coating comprising an outer surface, said coating comprising a first superficial layer beneath the outer surface having a first refractive index $n_1$ and a second layer beneath the first superficial layer having a second refractive index $n_2$, with $n_2<n_1$ and having a lowest refractive index of said polymer coating, and said coating exhibiting antireflective properties due to a difference between refractive indexes $n_1$ and $n_2$, said refractive index difference within the coating resulting from a plasma, corona, or an ion beam treatment of an initial polymer coating, through the outer surface.

2. The optical article of claim 1, wherein the coating comprises a third layer located beneath said second layer and having a refractive index $n_3>n_2$.

3. The optical article of claim 1, wherein $n_1-n_2$ is higher than or equal to 0.05.

4. The optical article of claim 1, wherein the first and the second layer are not adjacent and a refractive index within the polymer coating varies in a continuous or discontinuous manner from the first to the second layer.

5. The optical article of claim 4, wherein the variation of the refractive index is a gradient.

6. The optical article of claim 1, wherein said second layer has a higher porosity than said first layer.

7. The optical article of claim 1, wherein said outer surface of the coating exhibits a greater hardness after the plasma, corona, or ion beam treatment.

8. The optical article of claim 1, wherein the polymer coating has a thickness ranging from 2 micrometers to 4 micrometers.

9. The optical article of claim 1, wherein the second layer is located from 15 nm to 55 nm from said outer surface of the polymer coating.

10. The optical article of claim 1, wherein said outer surface of the coating has a roughness Ra lower than 10 nm.

11. The optical article of claim 1, wherein the polymer coating comprises at least one inorganic colloid.

12. The optical article of claim 1, wherein the polymer coating comprises a matrix comprising organic groups.

13. The optical article of claim 1, wherein the polymer coating comprises at least one epoxysilane polymer.

14. The optical article of claim 1, wherein the polymer coating is an abrasion resistant or anti-scratch coating.

15. The optical article of claim 1, wherein the outer surface of said polymer coating exhibits a luminous reflection Rv value lower than 2.5% at an angle of incidence of 15° and 45°.

16. The optical article of claim 1, wherein $n_1-n_2$ is higher than or equal to 0.10.

17. The optical article of claim 1, wherein said outer surface of the coating has a roughness Ra lower than 5 nm.

18. The optical article of claim 1, wherein said outer surface of the coating has a roughness Ra lower than 2 nm.

19. A method for manufacturing an optical article of claim 1, comprising treating with a plasma, a corona or an ion beam the initial polymer coating, through its outer surface, the optical article comprising a substrate with two main surfaces, at least one of which is covered by a polymer coating having an outer surface, to create first and second layers within the polymer coating, thereby conferring antireflective properties to the polymer coating.

20. The method of claim 19, wherein the optical article is treated by a plasma, obtained by a radiofrequency source with a surface power density ranging from 0.05 to 1.5 W/cm².

* * * * *